Inventor:
Heinz Heim,
By [signature]
His Attorney.

Inventor:
Heinz Heim,
By [signature]
His Attorney.

INVENTOR.
Heinz Heim

United States Patent Office 3,485,332

Patented Dec. 23, 1969

3,485,332

MEANS FOR DEENERGIZING THE DRIVING MOTOR OF A RECORD PLAYER

Heinz Heim, Langen, near Frankfurt am Main, Germany, assignor to Braun Aktiengesellschaft, Frankfurt am Main, Germany, a corporation of Germany Filed Feb. 21, 1967, Ser. No. 617,590
Claims priority, application Germany, Feb. 24, 1966, B 85,930
Int. Cl. F16p 3/00; H01h 47/24; H02p 3/22
U.S. Cl. 192—118 3 Claims

ABSTRACT OF THE DISCLOSURE

A driving mechanism, for tone arm sensed disk records, that includes an electric control circuit for an electric drive motor to rotate the record disk carrier, and in the control circuit there are arranged operating means for an electric stop switch for the drive motor, controlled by a bridge having a photoelectric resistor, balancing resistors, a differential member and a further relay, such as a transistor; a light source is arranged to impinge with a light pencil upon the photoelectric resistor, and a shutter is driven by the tone arm and is movable between the light bulb and the photoelectric resistor to intercept and, respectively, to clear the path, of the light pencil that is directed from the light bulb towards the photoelectric resistor.

The invention relates to a driving mechanism for a player of grooved disk records, and relates more particularly to means for deenergizing the driving mechanism at the end of the record play-back. Still more particularly, the invention relates to such a driving mechanism for such a record player for disk records, which includes a tone arm; and the driving mechanism is provided with a drive motor for the record disk carrier, an electric control circuit for the drive motor that comprises operating means for an electric stop switch for the motor, and a control bridge including a photoelectric resistor; and a shutter that is moved by the tone arm between a light source and the photoelectric resistor, and thereby controls the balance of the bridge, and operation of the electric stop switch in the circuit, to control the energization and respectively deenergization of the driving motor.

Mechanical stop switches have been known in the past, but they have the disadvantage that the retraction force of its control member, that is applied to the moving tone arm in the deflection region of the moving tone arm, disturbs the swinging symmetry of the sensing system; in very delicate sensing systems, this disturbance is audible.

Photoelectrical operation of stop switches have been proposed in the past to provide for the deenergizing of the driving mechanism in highly delicate sensing systems after one side of the record disk has been played, and these photoelectric stop switches did not in any way mechanically strain the tone arm. The stopping of the driving mechanism was accomplished, instead, by influence applied to the photoelectric resistor during the angular movement of the tone arm into the stop position, which stop position was determined by the run off portion of the record groove that guided the needle of the sensing system (record player E.R.A.).

The stop switch action of the aforesaid photoelectric stop switch, however, depends solely on the angular position of the tone arm; this meant that it depended on a predetermined size of radius of the run off portion of the record groove. If, on the other hand, the radius of the run off portion of the groove deviated from the aforesaid predetermined size, there occurred the danger that the driving mechanism of the record player might either be de-energized before the playback had been completed, or might not be de-energized at all.

It is accordingly among the principal objects of the invention to provide a driving mechanism of the type referred to that has a photoelectric stop switch, that avoids the drawbacks of the prior art and that will operate in connection with all customary sizes and revolving speeds of grooved disk records, such as spiral grooved phonograph records that have a run-off groove portion after the termination of the play-back groove portion.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel construction, arrangement and combination of various devices, elements and parts, as set forth in the claims hereof, certain embodiments of the same being illustrated in the accompanying drawings and described in the specification.

Broadly speaking, the instant invention provides for a driving mechanism of the type referred to that has an electric control circuit for the driving motor, which includes electric stop switch means and a differential member that differentiates the electric control current which varies in accordance with the movement of the tone arm transversely of the direction of recording, and a further switching element that responds whenever the differential quotient exceeds a predetermined value.

An electric stop switch means of this type will respond only in the region of stop-readiness that is equivalent to the deflection region in record players that have mechanical stop switches; the instant electric stop switch means will, however, respond in the stop-readiness region only when the needle of the tone arm has left the play-back groove portion and has entered into the run-off groove portion of the record.

The instant invention has the advantage that it renders possible for the first time, for instance for the repeated play-back of the last portion of a recorded piece of music, to place the recording needle of the tone arm into one of the grooves within the region of stop-readiness, while the drive motor is shut off, without risking thereby that during the subsequent start of the motor, the motor will at once be shut off again. In driving mechanisms with mechanical stop switches, in contrast thereto, it has been found that in such a case the control member of the tone arm during movement of the tone arm is not taken along safely frictionally for such a small distance that generally it is thereby not moved out of its stop position and hence will, during the subsequent starting of the record player, immediately operate the stop switch again.

The speed of deflection of the tone arm as it is taken along by the needle into the run-off groove portion changes, however, with the amount of revolutions per minute, that in commercial records lies between 16⅔ and 78 r.p.m. The time constant of the differential member would need to encompass such a large spectrum of revolving speeds of the record carrier, such as a phonograph turntable, that the differential member could not safely differentiate between such angular speeds of the tone arm; these angular speeds of the tone arm are large at a great eccentricity of the grooves of phonograph records that rotate at high revolving speeds, and the angular speeds of the tone arm are smaller at phonograph records that rotate at lower revolving speeds and have a smaller increase where the play-back groove portion leads to the run-off groove portion; where such safe differentiating is lacking, the stop switch may operate unreliably.

In order to meet this problem, and to provide for the safe functioning of the stop switch at all commercially used phonograph speeds, the instant invention includes an arrangement by which the time constant of its differential member is variable with the rotational speed of the drive mechanism.

In accordance with an embodiment of the invention which owing to its simplicity, is a preferred embodiment, the stop switch means comprises a relay that actuates at least the electric main circuit for the electric drive motor of the disk record carrier; the relay itself forms a part of an electric direct current exciter control circuit that comprises additionally a transistor that is controlled by means of a differential member from a photoelectric resistor.

Preferably, the aforesaid photoelectric resistor of the stop switch means is covered, throughout almost the entire play-back period of the record, by a movable shutter, the movement of which is controlled by the tone arm. This shutter will uncover the photoelectric resistor only gradually in the region of stop-readiness, thus generally only shortly before the entry of the sensing needle into the run-off groove portion of the record. This arrangement prevents the response and operation of the stop switch means during non-impingement of the light pencil that emanates from the light source and is directed towards the photoelectric resistor, and hence prevents that under those circumstances the operating electric current or currents of the record player would be interrupted. The record player that is provided with the instant arrangement remains operative even after the filament of the light source that normally tends to impinge with its light pencil onto the photoelectric resistor, ceases to function, except that upon such non-functioning of the light source the phonograph will need to be turned off manually.

The shutter that is controlled by the tone arm, may move arcuately, for instance along a portion of the periphery of a circle, or may move linearly during its movement intercepting the light pencil between the light source and the photoelectric resistor; this depends on whether the shutter is connected to a tone arm that moves about a fixed axis, or to a tangentially movable tone arm of the type that heretofore has been used mainly for the cutting of phonograph records.

The foregoing and other objects of the invention will be best understood from the following description of exemplifications thereof, reference being had to the accompanying drawings, wherein.

Figure 1:
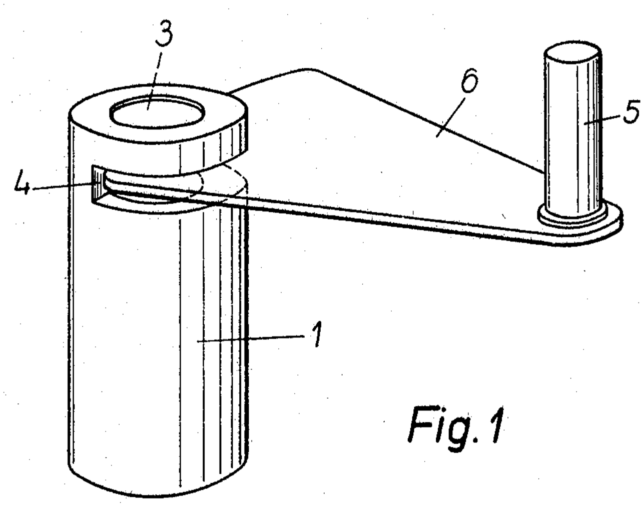
FIG. 1 is a fragmentary perspective view showing the photoelectric resistor of the stop switch in connection with the shutter driven by the tone arm.

In carrying the invention into effect in the embodiments which have been selected for illustration in the accompanying drawings and for description in this specification, and referring now particularly to FIG. 1, there is provided a photoelectric control means for the stop switch that coacts with the tone arm 30 or sensing arm means. The control means includes a tubus 1 which encases a light source, namely an electric light bulb 2 (see FIG. 3) that receives a constant voltage. The electric bulb 2 sends out a light pencil that tends to impinge on a photoelectric resistor 3 on the tubus 1, either by means of a frosted glass or a suitable optical system (not shown) that renders the light pencil homogenous.

A shutter 6 (FIG. 1) is provided that is connected to an axle 5 of the tone arm 30, and can move in a cut-out 4 of the tubus 1 between the bulb 2 and the photoelectric resistor 3; as the cut-out 4 extends throughout the entire effective surface area of the photoelectric resistor 3, the shutter 6 thus effectively is operative to intercept releasably the aforesaid light pencil which, except for the shutter 6, tends to impinge on the photoelectric resistor 3.

The shutter 6 is connected to the axle 5 of the tone arm in such a manner that it intercepts the light pencil in the tubus 1 almost throughout the entire region of the recording, and permits the light pencil to reach the photoelectric resistor 3 only upon the beginning of the stop-readiness region, thus only upon the entry of the sensing needle of the tone arm into the last play-back groove portions of the phonograph record, whereupon the shutter 6 will be moved clockwise (FIG. 1) and thus will permit an increasing portion of the cross section of the light pencil to impinge upon the photoelectric resistor 3.

Figure 2:
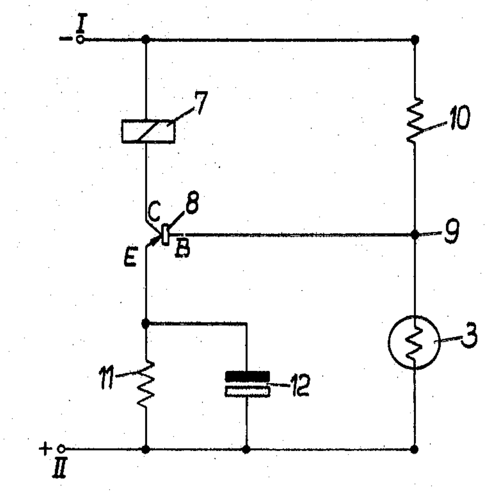
FIG. 2 is a wiring diagram of the photoelectric stop switch.

In FIG. 2 there is shown schematically the wiring diagram of the photoelectrically controlled stop switch. The coil of the relay 7 is provided in the circuit of FIG. 2. The relay 7 forms an operating stop switch means and has contacts 7.3 and 7.4 that actuate at least electric main circuit of the electric motor 20 of the driving mechanism for the carrier 21 of the disk record 32 such as the phonograph turntable. The coil 7.2 of the relay 7 is disposed in an emitter-collector circuit of a further switching element, namely a transistor 8, and is in series with a differential RC-circuit 11, 12, on a direct current voltage that is provided at terminals I, II of that circuit of FIG. 2. The base B of the transistor 8 is connected to a voltage tap 9 in a voltage divider that is formed by the photoelectric resistor 3 and a fixed resistor 10. The photoelectric resistor 3 is disposed with the RC-differential circuit 11, 12 within the base-emitter circuit of the transistor 8.

The collector current of the transistor 8, that flows through the coil of the relay 7, is controlled by the photoelectric resistor 3, and is influenced by the differential circuit 11, 12.

Figure 4:
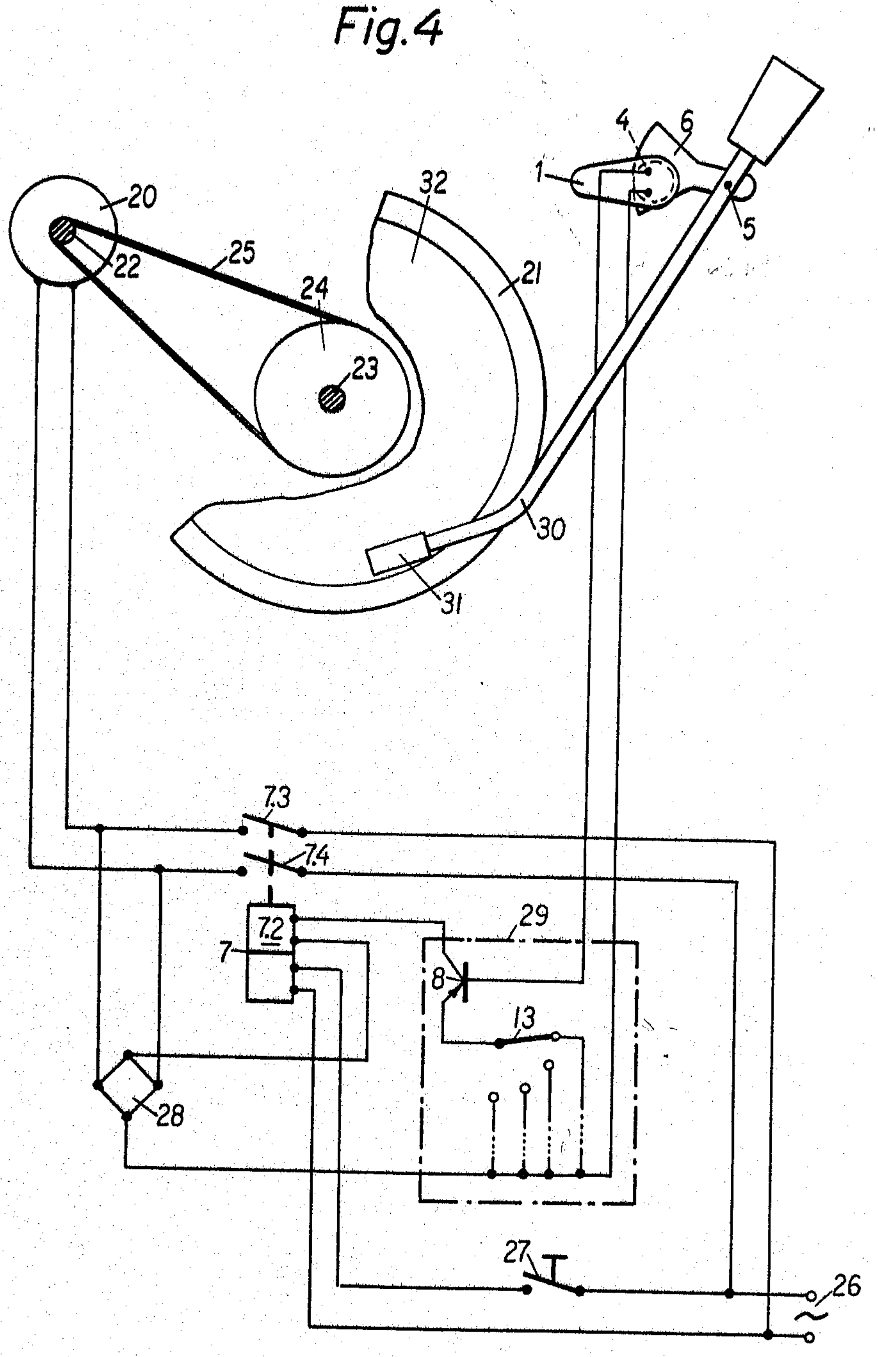
FIG. 4 is a schematic view of a record player and a wiring diagram therefor in accordance with the invention.

In FIG. 4 there is shown an electric motor 20 that drives a carrier 21 such as a turntable that carries and rotates a disk record 32. The motor 20 drives its motor shaft 22 which, in turn, drives a pulley 24 that is mounted on shaft 23 which is connected to the aforesaid turntable 21. A belt 25 connects the motor shaft 22 with the pulley 24, thereby driving the turntable 21 from the motor 20. The motor 20 may be connected to an electric network of alternating current by means of a motor circuit that includes at one end a plug 26, and includes a switch 7.3–7.4 that is operated by the relay 7.

The relay 7 has two coils 7.1 and 7.2 that control the relay 7 which, in turn, operates the switch 7.3–7.4 of the main circuit for the electric motor 20. A push button 27 controls a part of the control circuit for the relay 7, that is connected to the coil 7.1. This control circuit is parallel to the main circuit.

Figure 3:
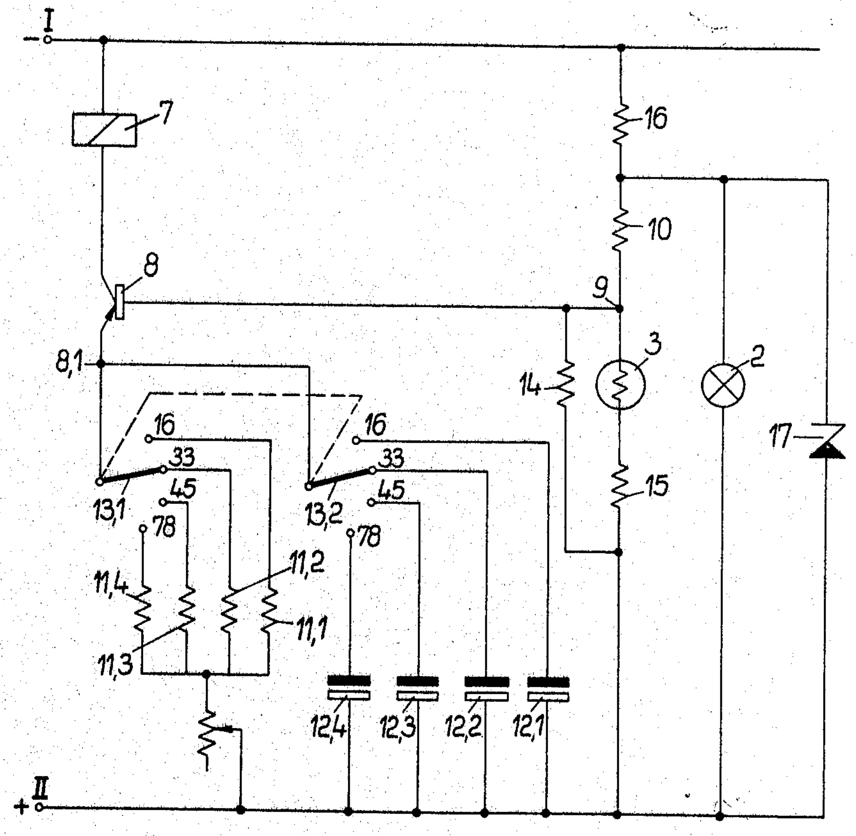
FIG. 3 is a wiring diagram of the stop switch with a shifting mechanism to change the time constant of the differential member in accordance with the revolving speed with which the driving mechanism rotates the disk record carrier.

As best shown in FIG. 4, there is provided a bridge rectifier 28 that is connected to the main electric circuit and that feeds the direct current control circuit shown in FIGS. 2 and 3. A transistor arrangement 29 is provided that includes the switching elements 10, 11, 12 and the transistor 8.

The record player includes the tone arm 30 that is connected to the axle 5 and carries a sensing system 31 such as a pick-up that includes a needle (not shown).

The operation is as follows:

When the record player is in operation, and its sensing system 31 is disposed about midway of the recording of the disk 32, and hence the tone arm 30 is outside the region of stop-readiness, the photoelectric resistor 3 will be covered entirely by the shutter 6, and hence will have a high ohmic resistance as compared to the fixed resistor 10. The ratio of the resistances 3, 10 is so dimensioned, that the transistor 8 will be modulated completely, so that its collector current will be limited only by the resistor 11 of the differential circuit 11, 12, and the inherent resistance of the coil of the relay 7. The relay 7 operates, and has closed the electric main circuit (see FIG. 4) for the electric driving motor.

During the aforesaid portion of the operation, the transistor arrangement 29 is fully modulated, and therefore the coil 7.2 of the relay 7 is passed by the full current. As explained below, when the sensing system 31 is disposed either at the starting portion of the groove or at the playback portion of the groove of the record 32, the push button 27 may be operated to energize the coil 7.1 of the relay 7, to close the main circuit by operating the relay contacts 7.3 and 7.4.

Beginning with a predetermined small radius of the play-back groove portion, the sensing needle of the tone arm 30 will enter the region of stop-readiness. In this region, the photoelectric resistor 3 is gradually uncovered by the shutter 6. Due to the steadily increasing impingement of the light pencil onto the photoelectric resistor 3, the electric resistance thereof steadily decreases. This, in turn, brings about a gradual approximately proportional decrease of the collector current, the value ratios of the resistors 3 and 10 being so selected that even when the shutter 6 is completely removed out of the cut-out 4 of the tubus 1, and thus the photoelectric resistor 3 is completely impinged by the light pencil, the current flowing through the coil of the relay 7 does not fall below a predetermined minimum value, namely the holding current value.

The voltage drop of the resistor 11 of the differential circuit 11, 12, is smaller than the base voltage, the difference corresponding to the voltage of the emitter base. With the decrease of the resistance of the photoelectric resistor 3, the base voltage at the tap 9 changes towards zero, whereby the voltage of the emitter base decreases and hence the current that flows from the emitter to the collector becomes smaller; thereby, however, the voltage drop of the resistor 11 also will be decreased, so that the voltage of the emitter base will increase again and hence there will be equalized the change of the voltage of the base.

A condenser 12 is arranged in parallel with the resistor 11, which imparts its excess load to the resistor 11. During a slow change of the value of the photoelectric resistor 3, the holding current of the coil of the relay 7 does not sink below a predetermined minimum value, namely the holding value.

When the needle of the sensing system 31 enters into the run-off groove portion of the phonograph record, the shutter 6 will suddenly be moved rapidly, so that there will result an equally rapid change in the resistance of the photoelectric resistor 3. The voltage of the resistor 11 cannot match sufficiently the sudden change of the voltage of the emitter base, as the condensor 12 of the differential member 11, 12 will, due to its considerable excess potential, initially hold the voltage on the emitter, so that the voltage of the emitter base will become too small and, respectively, the base will become positive relative to the emitter.

The collector current thereby will fall below the minimum value of the holding current of the coil 7.2 of the relay 7, and will finally be interrupted by the positive base. The relay 7 will thereby deenergized, and with its contacts 7.3 and 7.4 will interrupt the main electric current of the drive motor of the record carrier, thereby turning off the record player.

The stop switch may advantageously be utilized also for starting the record player when the tone arm 30 is near its starting or play-back positions. This has two advantages: namely this renders unnecessary to use any double pole main switch for the motor current parallel to the switching contacts of the relay 7; and furthermore, it renders possible to utilize simple working switch elements, preferably push buttons, for the starting and stopping of the record player.

For this purpose there is provided for the relay 7 a second coil 7.1 of well-known conventional constuction, that a push button 27 and together therewith forms a part of the control circuit of the record player. By operating the push button for a short time, the coil 7.1 of the relay 7 will be energized and the relay 7 will respond, and the relay 7 will thereby close with its contacts 7.3 and 7.4 the electric main circuit for the drive motor. The relay 7, however, will be held in its operative position by the control current of the stop switch energizing the coil 7.2, even after the push button 27 had been released, whereby the record player will be energized until the relay 7 is again operated to turn off the record played.

In FIG. 3 there is shown a wiring diagram for a record player that has several selectable revolving speeds. The differential circuit 11, 12 that is disposed in the emitter circuit of the transistor 8, may be shifted by a shifting contact 13 according to the selected revolving speed of the phonograph record, in such a manner that at lower revolving speeds the time constant of the differential circuit (as a product of the prevailing RC-values) is increased. The revolving speeds are shown near the terminals of the two-pole shifting contact 13 in FIG. 3.

In the arrangement of FIG. 3, furthermore, a fixed resistor 14 is disposed in the base circuit of the transistor 8 in parallel to the photoelectric resistor 3, and defines the initial value of the characteristic curve of the photoelectric resistor 3; and a resistor 15 is provided in series with the photoelectric resistor 3 and forms with the resistor 10 (see FIG. 2) the voltage divider for the voltage of the base. An operating resistor 16 for a Zener diode 17 is provided; the diode 17 stabilizes the operating voltage of the voltage divider and of the light bulb 2 for the photoelectric resistor 3.

I wish it to be understood that I do not desire to be limited to the exact details of construction shown and described, for obvious modifications will occur to a person skilled in the art. Thus, it is within the scope of the invention to use instead of a photoelectric resistor other well-known suitable conventional indicators as control elements for the stop switch, for instance ohm resistors, blind resistors, swing circles or Hall generators, and to differentiate in accordance with the lapse of time the magnitude of their movement which depends on the angular movement of the tone arm.

Having thus described the invention, what I claim as new and desire to be secured by Letters Patent, is as follows:

1. In a driving mechanism for grooved disk records having sensing arm means and a light source and a photoelectric resistor, the combination of a shutter in driven connection with said arm means movable between said light source and said photoelectric resistor, thereby operable to intercept releasably the light pencil directed from said light source to said photoelectric resistor, rapidly exposing increasing portions of said photoelectric resistor to said light source when said sensing arm means sense a certain part of said record near the end of said groove, an electric control circuit comprising said photoelectric resistor, operating stop switch means adapted to energize and to deenergize respectively at least a portion of said driving mechanism, a differential circuit that modifies the control current for the stop switch means in dependence of the difference between the voltage of the photoelectric resistor and the voltage of said differential circuit, and a further switching element in said control circuit and interconnected to said operating stop switch means, to said differential circuit and to said photoelectric resistor and that responds and actuates said stop switch means when said difference exceeds a certain predetermined value.

2. In a driving mechanism, as claimed in claim 1, said driving mechanism being adjustable to operate at different speeds thereby to revolve said disk at predetermined different selected revolving speeds, and means operable for varying the time constant of said differential circuit in accordance with the selected revolving speed.

3. In a driving mechanism, as claimed in claim 1, said control circuit being a direct current electric circuit, said stop switch means comprising an electric relay forming a part of said control circuit and being operable to energize and, respectively, to deenergize at least a portion of the driving mechanism, said further switching element comprising a transistor, the current through the coil of said relay being controlled by said transistor which, in turn, is controlled by said photoelectric resistor through said differential circuit.

References Cited

UNITED STATES PATENTS

| | | | |
|---|---|---|---|
| 2,056,372 | 10/1936 | Schwartz | 274—1 |
| 2,085,582 | 6/1937 | Guedon | 192—118 |
| 2,345,684 | 4/1944 | Pressley | 192—118 |
| 3,187,204 | 6/1965 | Adkins | 307—117 |
| 3,187,701 | 6/1965 | Heidt et al. | 192—142 XR |
| 3,356,908 | 12/1967 | Mitchell et al. | 307—117 |

MARK M. NEWMAN, Primary Examiner

ALLAN D. HERRMANN, Assistant Examiner

U.S. Cl. X.R.

250—231; 274—1; 307—117; 318—480